(12) United States Patent
Millar et al.

(10) Patent No.: US 8,593,517 B2
(45) Date of Patent: Nov. 26, 2013

(54) METHOD AND APPARATUS FOR CONFIGURING A VIDEO SURVEILLANCE SOURCE

(75) Inventors: Greg Max Millar, Coarsegold, CA (US); Farzin Aghdasi, Clovis, CA (US); Jennifer Joyner, Clovis, CA (US)

(73) Assignee: Pelco, Inc., Clovis, CA (US)

( * ) Notice: Subject to any disclaimer, the term of this patent is extended or adjusted under 35 U.S.C. 154(b) by 1299 days.

(21) Appl. No.: 12/055,458

(22) Filed: Mar. 26, 2008

(65) Prior Publication Data

US 2008/0244409 A1 Oct. 2, 2008

Related U.S. Application Data

(60) Provisional application No. 60/920,311, filed on Mar. 26, 2007.

(51) Int. Cl.
*H04N 7/18* (2006.01)
*H04N 5/76* (2006.01)

(52) U.S. Cl.
USPC ........................................ 348/143; 348/231.6

(58) Field of Classification Search
USPC .............................................. 348/143, 231.6
See application file for complete search history.

(56) References Cited

U.S. PATENT DOCUMENTS

| | | | |
|---|---|---|---|
| 7,007,158 B1 * | 2/2006 | Mahmoud | 713/1 |
| 2005/0138620 A1 * | 6/2005 | Lewites | 718/1 |
| 2005/0149877 A1 * | 7/2005 | Rice et al. | 715/764 |
| 2007/0185989 A1 * | 8/2007 | Corbett et al. | 709/224 |
| 2008/0174678 A1 * | 7/2008 | Solomon | 348/231.99 |

* cited by examiner

*Primary Examiner* — Thomas Dailey
*Assistant Examiner* — Ebrahim Golabbakhsh
(74) *Attorney, Agent, or Firm* — Hamilton, Brook, Smith Reynolds, P.C.

(57) ABSTRACT

A method of controlling a video source in a video surveillance system having a video source connected by a network to a workstation having a graphical user interface for enabling a user to control the video source comprising the steps of providing a video analysis program for analyzing the video images generated by the video source before the video images are transmitted over the network, providing a file containing the user interface controls for the graphical user interface and the parameters for configuring the video analysis program; storing the file in memory, downloading the file to the workstation at run time and enabling a user to configure the video analysis program by interacting with the graphical user interface.

16 Claims, 8 Drawing Sheets

METHOD AND APPARATUS FOR CONFIGURING A VIDEO SURVEILLANCE SOURCE

CROSS-REFERENCE TO RELATED APPLICATION

This application is related to and claims the benefit of U.S. Provisional Patent Application Ser. No. 60/920,311, filed Mar. 26, 2007, entitled DYNAMIC USER INTERFACE, the entirety of which is incorporated herein by reference.

STATEMENT REGARDING FEDERALLY SPONSORED RESEARCH OR DEVELOPMENT

N/A

BACKGROUND OF THE INVENTION

This invention relates generally to surveillance systems and, in particular, to a method and apparatus for configuring a video surveillance source in a video surveillance system.

Typically, the user interface for video surveillance systems needs to be customized with each new product added to the system, which in turn could cause an upgrade nightmare for the end-user. This problem has been compounded by the complicated networks that are emerging for today's video surveillance systems. Accordingly, there has been a long felt need for a system and method that does not require a software patch or upgrade to work with new analytic behaviors for analyzing video images generated by video cameras. These analytic behaviors can be, for example, direction of object movement, object counting, and object removal.

SUMMARY OF THE INVENTION

In accordance with the present invention there is provided a method of controlling a video source in a video surveillance system having a video source connected by a network to a workstation having a graphical user interface for enabling a user to control the video source comprising the steps of providing a video analysis program for analyzing the video images generated by the video source before the video images are transmitted over the network, providing a file containing the user interface controls for the graphical user interface and the parameters for configuring the video analysis program; storing the file in memory, downloading the file to the workstation at run time and enabling a user to configure the video analysis program by interacting with the graphical user interface.

In another aspect of the present invention there is provided a video surveillance system comprising a network, a workstation connected to the network and having a graphical user interface and adapted to send commands over the network to devices connected to the network; and a video source for generating video images connected to the network, the video source having a video analysis module for analyzing the generated video images before the video images are transmitted over the network by the video source and a file comprising the user interface controls for the graphical user interface and the parameters for configuring the video analysis module to enable a user to configure the video analysis module, the video source providing the file when the workstation provides a command to the video source over the network.

In a further aspect of the present invention there is provided a computer readable medium comprising instructions that, when executed by a computer, cause the computer to be adapted to enable a user to perform the method of controlling a video source in a video surveillance system having a video source connected by a network to a workstation having a graphical user interface for enabling a user to control the video source comprising the steps of providing a video analysis program for analyzing the video images generated by the video source before the video images are transmitted over the network, providing a file containing the user interface controls for the graphical user interface and the parameters for configuring the video analysis program; storing the file in memory, downloading the file to the workstation at run time and enabling a user to configure the video analysis program by interacting with the graphical user interface.

The present invention allows the shipment and use of new plug-in programs that self-describe their user interface and configuration through a file, such as an extensible markup language (XML) file. The user interface does not require a software patch to work with the new analytic behaviors because they are self-contained. Once a new behavior is installed on an encoder or other device, the workstation or client simply asks the encoder or other device at run time to provide the necessary configuration and user interface, and it is displayed on the workstation display. If the encoder contains more than one video analysis module, then a user can select the one of interest from a menu. The workstation processes the file and displays the user interface elements appropriate for configuring the selected behavior analytic. The file also provides the minimum and maximum values, ranges, options, and the default settings for each user interface control.

Other advantages and applications of the present invention will be made apparent by the following detailed description of the preferred embodiment of the invention.

DETAILED DESCRIPTION OF THE INVENTION

Figure 1:
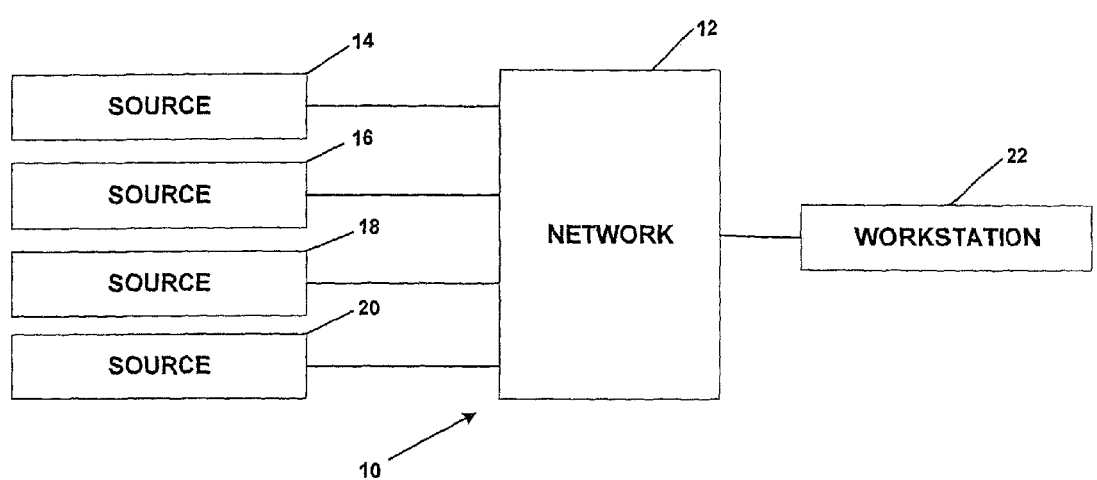
FIG. 1 is a block diagram of a video surveillance system utilizing the present invention.

Referring to FIG. 1, a video surveillance system 10 has a network 12 which can be a closed network, local area network, or wide area network, such as the Internet. A plurality of video sources 14, 16, 18, and 20, which can be, for example, video cameras, digital video recorders or servers, are connected to network 12 to provide real-time video streams, such as MPEG video streams. Workstation 22, which can be, for example, a control point in surveillance system 10, a personal computer or a user logged into surveillance system 10 by means of a laptop computer, is connected to network 12. Sources 14, 16, 18, and 20 provide MPEG video streams to workstation 22 via network 12.

Figure 2:
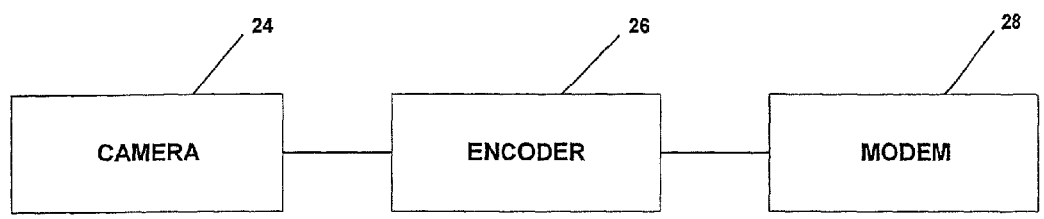
FIG. 2 is a block diagram of an exemplary video source in the video surveillance system shown in FIG. 1.

An exemplary video source is illustrated in FIG. 2 in block diagram form. Camera 24 provides its output to encoder 26, which contains a processor and memory. Encoder 26 provides an MPEG video stream to modem 28 for transmitting to network 12. It is to be understood that although camera 24, encoder 26, and modem 28 have been shown as separate devices, their functions can be provided in a single device or in two devices rather than three separate devices as illustrated.

Figure 3:
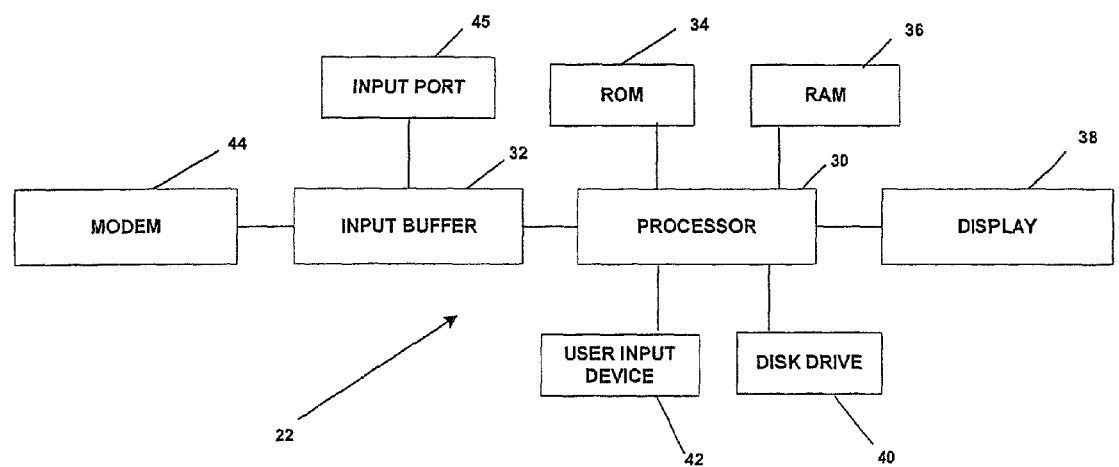
FIG. 3 is a block diagram of an exemplary workstation in the video surveillance system shown in FIG. 1.

With reference to FIG. 3, an exemplary workstation of the present invention is shown in block diagram form. Workstation 22 has a processor 30 which is connected to input buffer 32, ROM 34, RAM 36, display 38, disk drive 40 and user input device 42. Processor 30 can be a central processing unit or a digital signal processor or both. User input device 42 can be a keyboard, mouse, controller, or other suitable input device. Processor 30 implements algorithms and programs that are stored in ROM 34 or disk drive 40 in response to user input from user input device 42 and provides output signals to display 38. Modem 44 is connected to network 12 and receives the MPEG video streams from sources 14, 16, 18, and 20 in FIG. 1. Modem 44 provides the MPEG video streams to input buffer 32. The video stream data can be stored in a partition of disk drive 40 according to the method of the present invention. Input port 45, which can be, for example, a USB or FireWire port, can also provide video streams to input buffer 32. Alternatively, processor 30 can have its own input buffers, or a portion of RAM 36 can be used as an input buffer.

Encoder 26 can store algorithms in memory for analyzing the video images generated by camera 24. These analytic program modules can detect various behaviors and occurrences in the video images, for example, object counting, directional motion, and the removal of an object. In addition, a file containing the user interface controls for the graphical user interface displayed on display 38 and the parameters for configuring the video analysis program are also stored in memory at encoder 26. This file can be part of the analytic program module or a separate file associated with the analytic module. At run time, the file is downloaded to the workstation and run to enable a user to configure the video analysis program stored at encoder 26 by interacting with the graphical user interface on display 38 at workstation 22.

Figure 4:
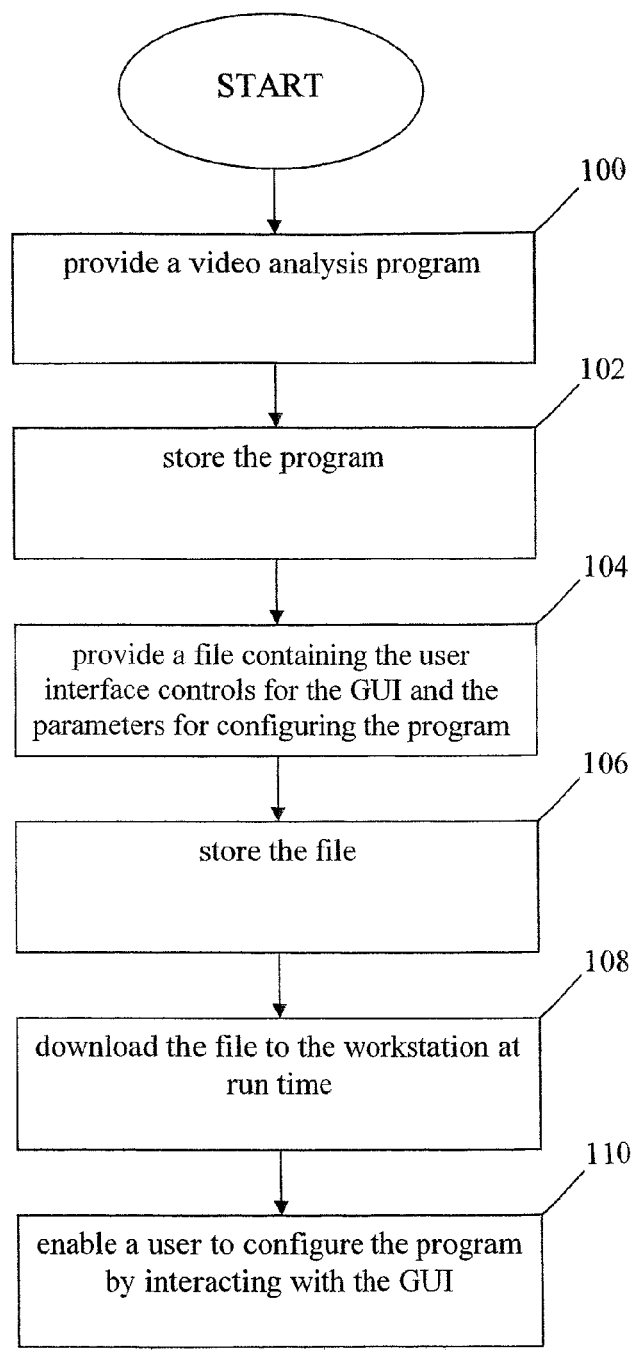
FIG. 4 is a flowchart illustrating one embodiment of the process of the present invention

A flowchart for implementing one embodiment of the method of the present invention is disclosed in FIG. 4. At step 100 a video analysis program is provided and stored in step 102. The video analysis program can be provided to encoder 26 in numerous ways such as by downloading from a server or a disk loaded at some point in network 12. The video analysis program is stored in the memory of encoder 26. A file, such as an extensible markup language (XML) file, containing the user interface controls for the graphical user interface displayed on display 38 and the parameter for configuring the program are provided in step 104 and stored in step 106. As discussed above, this file can be stored as a separate file in encoder 26 or as part of the video analysis module. At run time for the video analysis program, the XML file is downloaded to workstation 22 to enable a user to configure the program by interaction with the graphical user interface displayed on display 38.

The present invention allows the shipment and use of new plug-in programs that self-describe their user interface and configuration through a file, such as an XML file. The user interface does not require a software patch to work with the new analytic behaviors because they are self-contained. Once a new behavior is installed on encoder 26, the workstation or client simply asks encoder 26 to provide the necessary configuration and user interface, and it is displayed on display 38. If the encoder contains more than one video analysis module, then a user can select the one of interest from a menu. Workstation 22 processes the XML file and displays the user interface elements appropriate for configuring the selected behavior analytic. The XML file also provides the minimum and maximum values, ranges, options, and the default settings for each user interface control.

Figure 5:
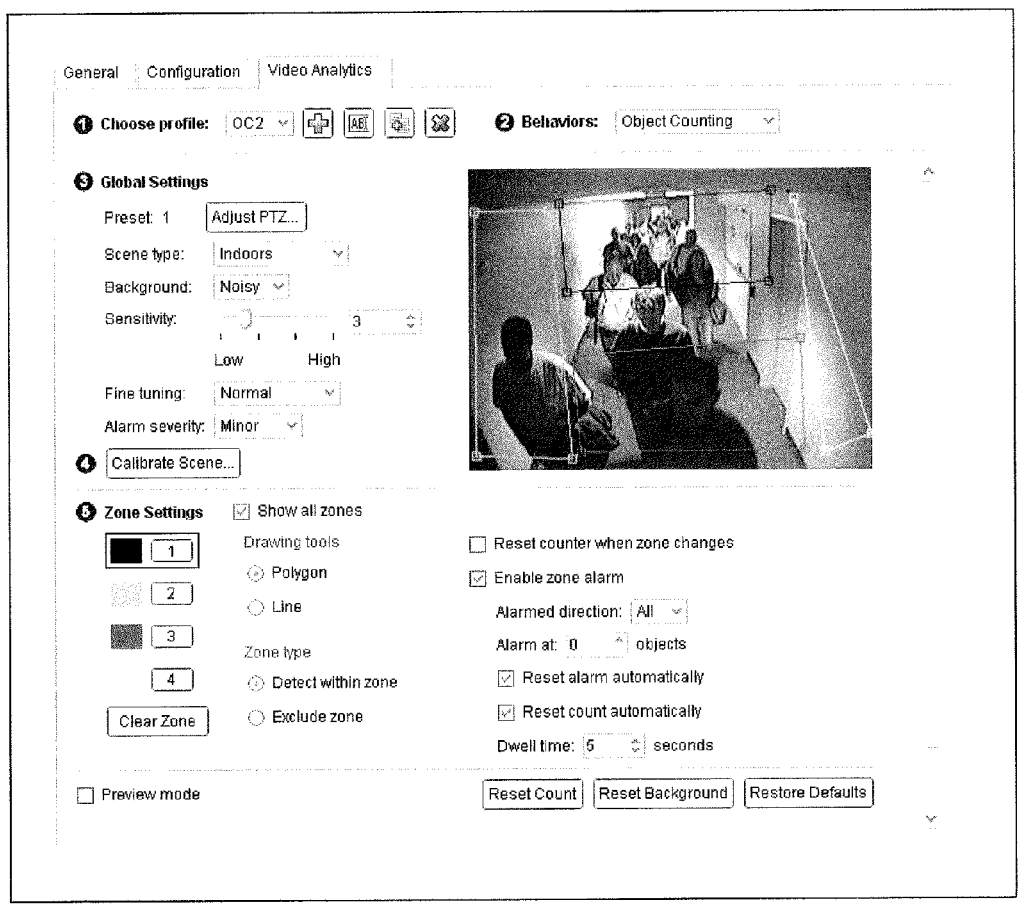
FIG. 5 is a screen view illustrating an example embodiment of a graphical user interface for configuring an object counting analytic.
Figure 6:
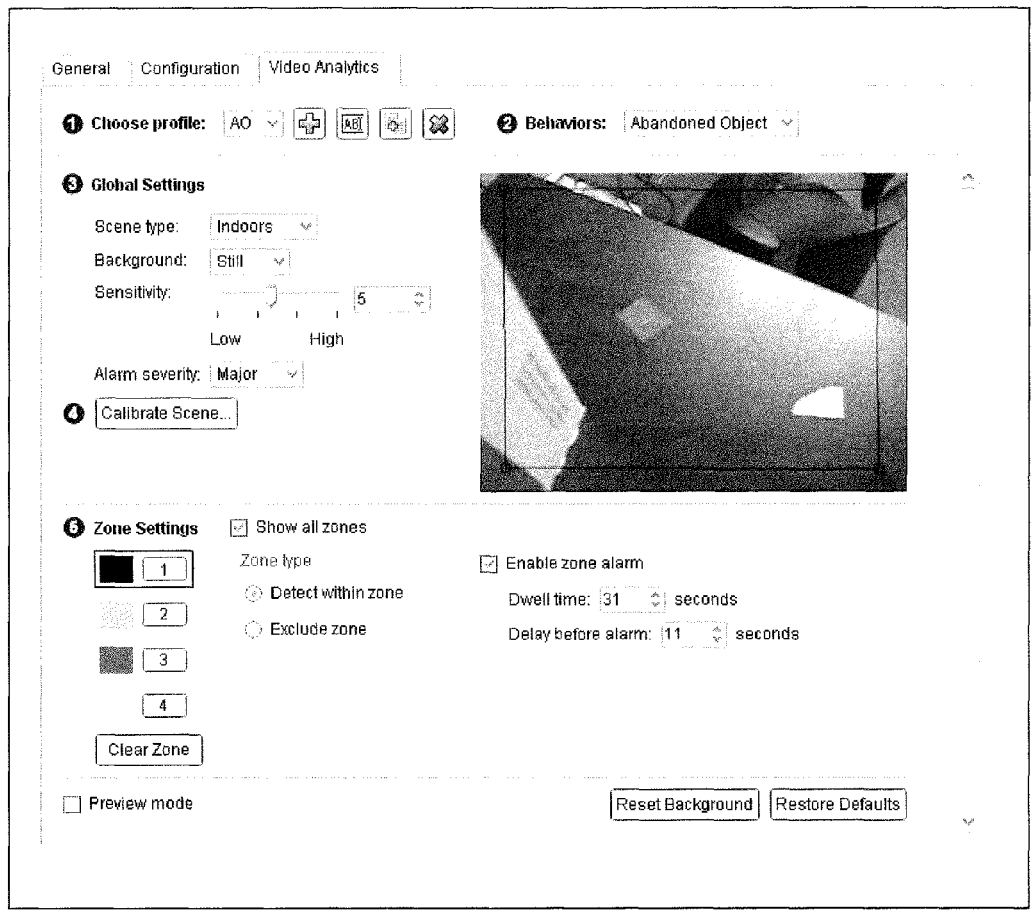
FIG. 6 is a screen view illustrating an example embodiment of a graphical user interface for configuring an abandoned object analytic.
Figure 7:
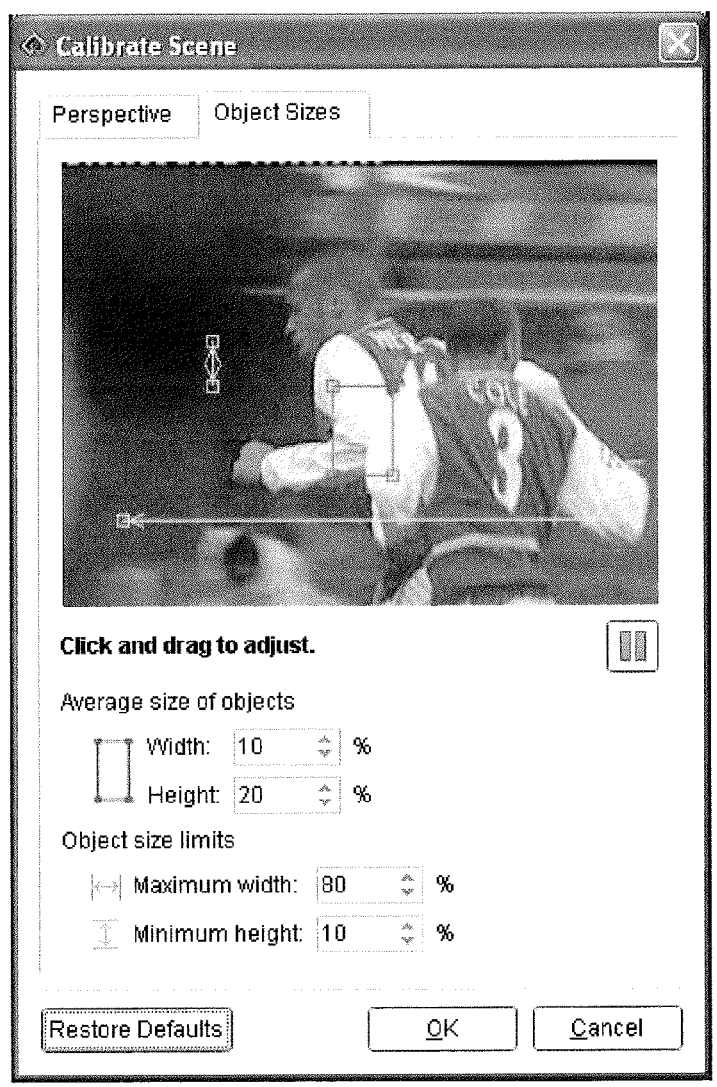
FIG. 7 is a screen view illustrating an example embodiment of a graphical user interface for additional configuration of an object counting analytic.
Figure 8:
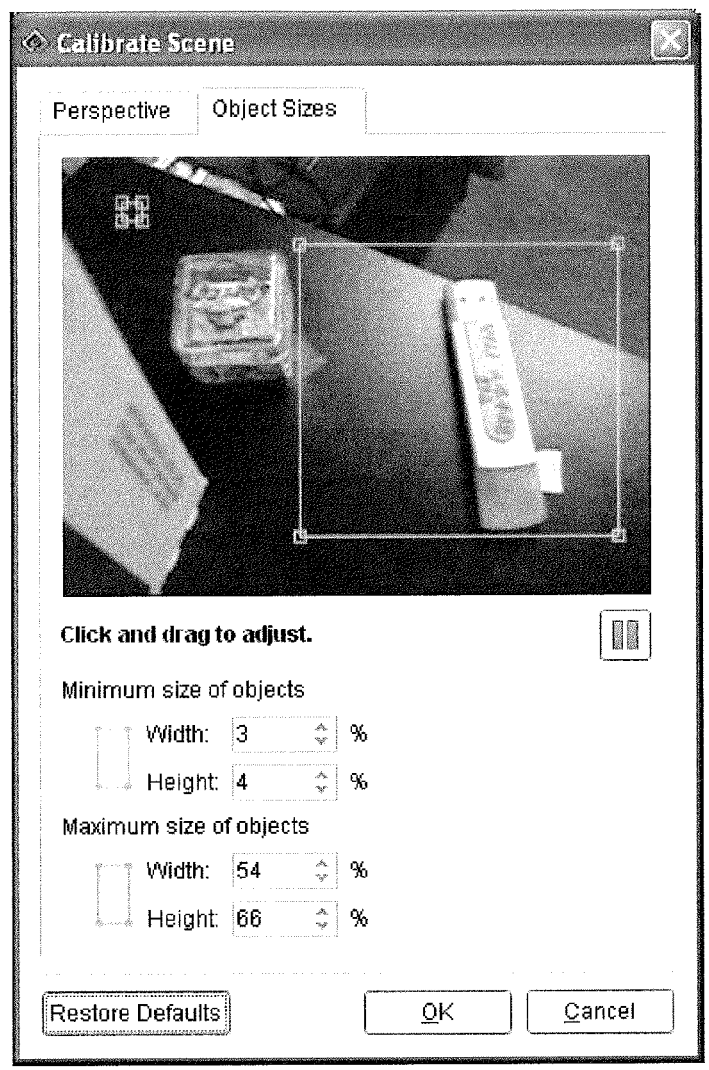
FIG. 8 is a screen view illustrating an example embodiment of a graphical user interface for additional configuration of an abandoned object analytic.

Sample graphical user interfaces displayed on display 38 for configuring video analytics are illustrated in FIG. 5-8. FIG. 5 illustrates a graphical user interface for configuring an object counting analytic, and FIG. 6 illustrates a graphical user interface for configuring an abandoned object analytic. These sample GUIs exhibit the configuration differences for different analytics. In particular, global settings and zone settings are quite different. FIG. 7 illustrates additional parameters for configuring the object counting analytic of FIG. 5, i.e., average size of objects and object size limits. FIG. 8 illustrates additional parameters for configuring the abandoned object analytic of FIG. 6, i.e., minimum size of objects and maximum size of objects.

The video analytic program and the XML file can be stored separately or together on a computer readable medium, which refers to any storage device used for storing data accessible by a computer. Examples of a computer readable medium include a magnetic hard disk, a floppy disk, an optical disk, such as a CD-ROM or a DVD, a magnetic tape, a memory chip, and a carrier wave used to carry computer readable electronic data, such as those used in transmitting and receiving e-mail or in accessing a network.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

What is claimed is:

1. A method of controlling a digital video source in a video surveillance system having the digital video source connected by a network to a workstation having a graphical user interface for enabling a user to control the digital video source, the method comprising:
    providing a video analysis program, at the digital video source, capable of and configured to detect analytic behavior of an object in digital video images generated by the digital video source, the analytic behavior being detected before the digital video images are transmitted by the video source over the network;
    providing a file containing user interface controls for the graphical user interface and parameters for configuring the video analysis program;
    storing the file with the video analysis program at the digital video source;
    downloading the file containing the user interface controls and the parameters for configuring the video analysis program at the workstation at run time; and
    enabling a user to configure the video analysis program by interacting with the graphical user interface.

2. The method as recited in claim 1 wherein providing a file comprises providing an XML file containing the user interface controls for the graphical user interface and the parameters for configuring the video analysis program.

3. A video surveillance system, comprising:
a workstation connected to a network and having a graphical user interface, the workstation being adapted to send commands over the network to devices connected to the network; and
a digital video source configured to generate digital video images connected to the network, the digital video source having:
a video analysis module, at the digital video source, capable of and configured to detect analytic behavior of an object in the digital video images generated by the digital video source before the digital video images are transmitted by the digital video source over the network; and
a file comprising user interface controls for the graphical user interface and parameters for configuring the video analysis module, the video source configured to provide the file upon request from the workstation.

4. The video surveillance system as recited in claim 3 wherein the video source includes a camera.

5. The video surveillance system as recited in claim 3 wherein the video source includes a camera connected to an encoder and video analysis module and wherein the file is stored in the encoder.

6. The video surveillance system as recited in claim 3 wherein the video source includes a digital video recorder.

7. The video surveillance system as recited in claim 3 wherein the video source includes a server.

8. The video surveillance system as recited in claim 3 wherein the video analysis module and the file reside in the same software module.

9. A non-transient computer readable medium having computer instructions stored thereon, the computer instructions being loadable and executable by a processor, and when executed, cause the processor to:
detect analytic behavior of an object in digital video images generated by a digital video source, by using a video analysis program configured to detect analytic behavior of an object in digital video images, the analytic behavior being detected before the digital video images are transmitted by the video source over a network;
provide a file containing user interface controls for a graphical user interface and parameters for configuring the video analysis program;
store the file with the video analysis at the digital video source;
download the file containing the user interface controls and the parameters for configuring the video analysis program at a workstation at run time; and
enable a user to configure the video analysis program by interacting with the graphical user interface.

10. The non-transient computer readable medium as recited in claim 9 wherein said instructions cause the processor to provide an XML file containing the user interface controls for the graphical user interface and the parameters for configuring the video analysis program.

11. The method of claim 1 wherein the video analysis program to detect analytic behavior of an object in digital video images includes object counting, directional motion of objects, or removal of an object from the digital video image.

12. The method of claim 1, wherein the graphical user interface includes a profile setting, an analytic behavior detection setting, a plurality of global settings, and a plurality of zone settings, wherein zone settings include specifying a region within a scene in said digital video images.

13. The method of claim 2 wherein the parameters for configuring the video analysis program, include parameters corresponding to an average size of objects, abandoned object analytic, minimum size of objects, and maximum size of objects.

14. A method, comprising:
providing a video analysis program configured to detect analytic behavior of objects within a scene having representations in digital video images generated by a digital video source;
providing a file specifying user interface controls for a graphical user interface and configuration parameters for the video analysis program;
installing one or more analytic behavior detection modules at the digital video source, the one or more analytic behavior detection modules configured to detect the analytic behavior before the digital video images are transmitted by the video source over a network: and
displaying a representation of one or more analytic behavior detection modules for selection on the graphical user interface of a requesting workstation.

15. The method of claim 14, wherein installing the one or more analytic behavior detection modules includes installing an analytic behavior detection module configured to detect directional motion of an object within a scene.

16. The method of claim 14, further comprising:
displaying, through use of the graphical interface, a group of global settings including a scene type setting and a background setting.

* * * * *